United States Patent [19]

Suzuki

[11] Patent Number: 5,243,435
[45] Date of Patent: Sep. 7, 1993

[54] METHOD OF DECODING MR CODES OF CONTINUOUS VERTICAL MODE DATA FOR THE SAME CHANGE POINTS

[75] Inventor: Yuji Suzuki, Nagaokakyo, Japan

[73] Assignee: Murata Kikai Kabushiki Kaisha, Kyoto, Japan

[21] Appl. No.: 808,601

[22] Filed: Dec. 17, 1991

[30] Foreign Application Priority Data

Dec. 17, 1990 [JP] Japan .................................. 2-411129

[51] Int. Cl.$^5$ .............................................. H04N 1/419
[52] U.S. Cl. .................................. 358/261.3; 358/426
[58] Field of Search ............... 358/261.3, 261.1, 261.2, 358/426, 427, 262.1, 261.4

[56] References Cited

U.S. PATENT DOCUMENTS

| | | | |
|---|---|---|---|
| 4,750,043 | 6/1988 | Hisada et al. | 358/261.1 |
| 4,807,043 | 2/1989 | Kaku et al. | 358/261.3 |
| 4,809,081 | 2/1989 | Linehan | 358/261.3 |
| 4,839,738 | 6/1989 | Kaku et al. | 358/261.2 |
| 4,860,114 | 8/1989 | Horikawa | 358/261.2 |

Primary Examiner—Edward L. Coles, Sr.
Attorney, Agent, or Firm—Spensley Horn Jubas & Lubitz

[57] ABSTRACT

In decoding method of MR codes, decoding procedure is omitted at a part of V(0) continuing in one line, and the run length code of the reference line is copied and the process is repeated in the number less than the continuing number by one, thereby the decoding process can be carried out at high speed.

2 Claims, 1 Drawing Sheet

METHOD OF DECODING MR CODES OF CONTINUOUS VERTICAL MODE DATA FOR THE SAME CHANGE POINTS

BACKGROUND OF THE INVENTION

1. Field of the Invention

The present invention relates to a decoding method for MR codes in a facsimile or the like.

2. Description of the Prior Art

In facsimiles, many encoding systems are used for transmitting picture information. Among these systems, the MH encoding system, the MR encoding system and the MMR encoding system are typical systems that are widely practical. An outline of these systems will be described as follows.

(1) MH encoding system . . . This encoding system utilizes correlation between neighboring picture elements in the main scan direction (the lateral direction) on the run length (the length of black or white continuing in one line, expressed by an integer) as represented by one or two MH codes. Code representing the last run length in one line is encoded by a (EOL) indicating the end of the line.

(2) MR encoding system . . . This encoding system utilizes correlation of picture elements not only in the main scan direction but also in the sub scan direction (the longitudinal direction). The run length of the immediately preceding line is compared with the run length of the line to be encoded, and encoding is carried out according to the change point data. However, the top line of the top page and each line per a defined number of lines (for example, per two lines in normal mode, per four lines in fine, per eight lines in super fine mode) are encoded using an MH encoding system. Code representing the last run length of one line is encoded by a code (EOL) representing the end of the line.

(3) MMR encoding system . . . Encoding from the first line of the page to the last line is carried out using an MR encoding system. However, when the top line of the page is encoded, an imaginary all white line is used as a reference line for comparing the change point. Consequently, at the receiving side, when the first line of the page is decoded, the decoding is carried out assuming that an all white line exists before the first line.

The MR code will be described in further detail. Regarding the present invention, since an MMR code may be treated the same as an MR code, the MMR code shall be included in the MR code in the following description.

The MR code is constituted by a combination of mode symbol and code representing its details. Since codes of variable length are constituted by a combination of "1" and "0", actual decoding is carried out by recognizing code data of "1" "0", but the following description shall be carried out by the mode symbol.

The MR code compares and represents the order relation, in the main scan direction, of points where picture elements are changed from white to black or from black to white (hereinafter referred to as "change points" regarding the reference line and the line to be encoded. The MR code includes a pass mode, a horizontal mode and a vertical mode, expressed by P, H, and V respectively. The mode symbol is V(0) regarding the part where the change points are the same with respect to both the reference line and the line to be encoded. For example, where the reference line and the line to be encoded have the same change points in white, black, white, black . . . , the mode symbols are expressed by V(0), V(0), V(0), . . . .

In an ordinary facsimile document, the ratio of V(0) appearing continuously is high, and in a detailed document, the frequency with which V(0) appears becomes even larger. Therefore, in the MR code, a code "1" (one bit being the shortest code) is allocated for the mode symbol of V(0). On the contrary, a code having a longer bit number is allocated for the mode symbol which appears less frequently.

Decoding of such MR code is carried out in that the MR code into run length code (RL code) indicating the length of continuing picture elements of white or black and then converting into bit data. In a manner similar to encoding, the decoding is carried out by using the immediately preceding line as a reference line. The reference line is data with the run length code (RL code) continuing, and the decoded data is stored in the line memory so as to decode the next line, and then becomes the reference line so as to decode next line.

Decoding in such manner is carried out also regarding the above-mentioned V(0) mode in similar manner to other mode, in repeating procedure that the picture element change point succeeding the reference line is read out from the line memory and decoded in sequence. Consequently, when the data number of one line is large, more time is required for the decoding and a large problem occurs in the high speed operation of the facsimile.

SUMMARY OF THE INVENTION

In order to solve the above-mentioned problems in the prior art, an object of the present invention is to omit a decoding procedure when V(0) continues, and to improve the high speed operation of decoding.

In the method of decoding MR code, the present invention is characterized in that part of V(0) continuing in one line is continued in the number less than the continuing number by one, and the run length code of the reference line is copied.

FIG. 2 is an explanatory diagram of the action of the present invention. The reference line is a line to be decoded since then. In both lines, the first part of the line is exemplified in bit pattern. In the line designated mode symbol, the MR code of the decoding line is expressed by a mode symbol. V(0) is preferably expressed by the code symbol "1", as above described. The decoding line is decoded into the RL code, while the RL data of the reference line is referred. If V(0) appears first, it is subjected to ordinary decoding, since the next data is $V_R(2)$ and V(0) is not continued. Also in $V_R(2)$, P, V(0), $V_R(1)$, ordinary decoding is carried out.

Next, starting from the succeeding V(0), four pieces of V(0) continue. This is because the points A-B, between the points B-C, and between the points C-D is the same pattern in the decoding line as that of the reference line. Usually, for each V(0), decoding to the RL code is carried out by referring to the RL data of the reference line.

In the present invention, when four pieces of V(0) continue, since three of these pieces are the same as the RL data of the reference line, in place of decoding, the RL code in the part shown by P, Q, R is simply copied. Generally speaking, for a continuation of n pieces of V(0) (a continuation of n pieces of "1" in the MR code), (n−1) pieces of RL code of the reference line are copied. In the last V(0) and the subsequent $V_L(1)$ and so forth, ordinary decoding is carried out, and at the next continuation of V(0), a similar copy operation is carried out.

As above described, in the part of continuation of V(0), ordinary decoding is not carried out, but decoding is possible by merely copying the RL code, thereby revising the decoding speed.

DESCRIPTION OF THE PREFERRED EMBODIMENTS

Figure 1:
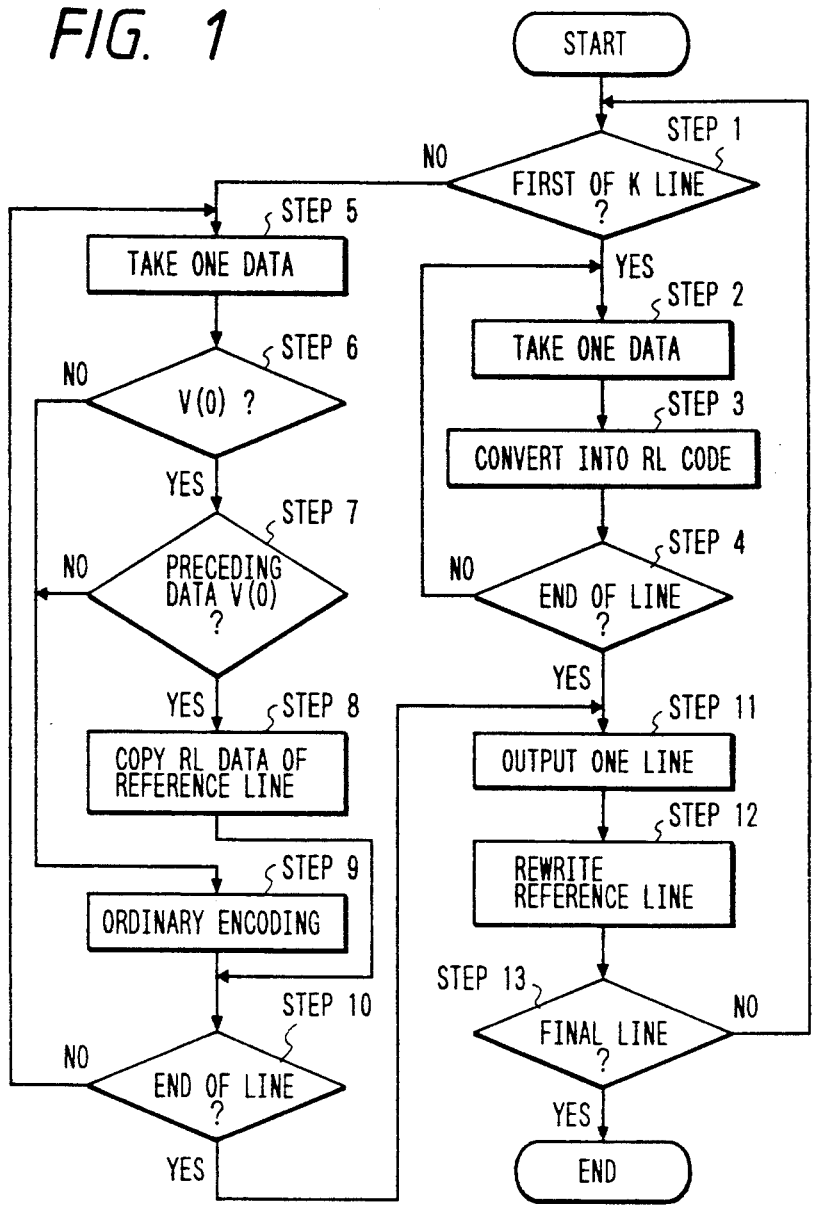
FIG. 1 is a flow chart explaining an embodiment of the invention.
Figure 2:
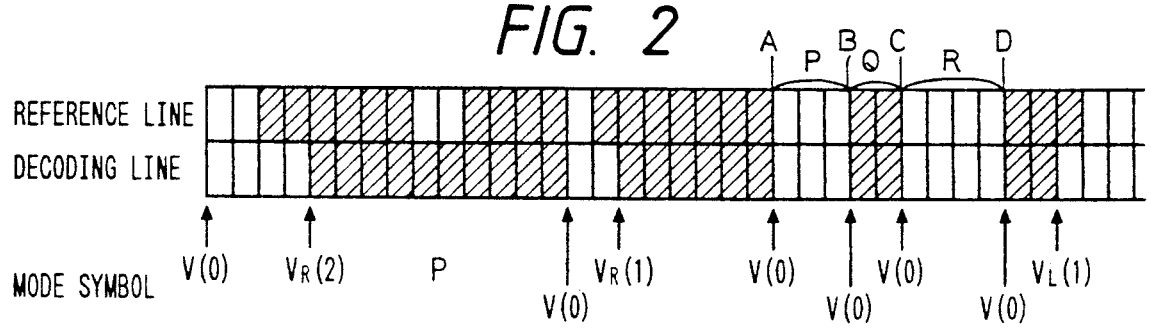
FIG. 2 is an explanation diagram of action of the invention.

An embodiment of decoding method of the present invention will be described referring to a flow chart in FIG. 1. The case of an encoding system will be described, and also an MMR encoding system, since a line of all white may be assumed as the first line and may be made the reference line, and the decoding can be carried out using a similar method.

At the start of the reception or reading of data received in memory, the flow is started. In the MR encoding system, since the first line in every K lines is encoded by an MH code, if the line to be decoded is the first line in every K lines, then it is an MH code. The transfer from Step 1 to Step 2 is carried out and one data is taken out. At Step 3, the table is referenced and a conversion to the RL code is carried out. The process is looped from Step 4 to Step 2, and this is repeated and the data of one line is converted into the RL code in sequence.

If the conversion of one line is finished, then the transfer from Step 4 to Step 11 is carried out and the converted data of one line is outputted, and the process advances to Step 12 and the reference line memory is rewritten so as to make the data the reference line for the next line, and the process is returned from Step 13 to Step 1.

Since the next line is not the first line in K lines, it is a line encoded by an MR code. The process advances from Step 1 to Step 5, and one data is taken. If this data corresponds to V(0), the preceding data is viewed at Step 7. Since the preceding data is not V(0), the process is transferred to Step 9 and ordinary decoding of the MR code is carried out, and the process is looped from Step 10 to Step 5 and the next data is taken.

If this next data is also V(0), then the process advances from Step 7 to Step 8 and the corresponding RL data in the reference line is copied. Subsequently, as long as V(0) continues, the corresponding RL data in the reference line are copied in sequence. Consequently, as long as V(0) continues, ordinary decoding is not carried out.

At step 6, if data other than V(0) is taken, then the process is transferred to Step 9 and ordinary decoding is carried out. If V(0) is only one and does not continue, then the process is transferred from Step 6, Step 7 to Step 9, and ordinary decoding is carried out in a similar manner.

If the decoding of data of one line is finished, then the process is transferred from Step 10 to Step 11, and the decoded data of one line is outputted, and at Step 12, the reference line data is rewritten, and the process is looped from Step 13 to Step 1.

The line of the MR code is repeated and decoded until the K lines are finished, and since it becomes MH code at the first line of the next K lines, the above-mentioned flow is repeated again and the decoding is carried out.

If all lines of one page are finished, the loop is escaped from Step 13 and the encoding of the page is finished. If the page continues, then this is repeated.

In the above description, every time V(0) continues, the corresponding RL data of the reference line is copied one by one, but at Step 6 through Step 8, the number of the continuing V(0), i.e., the MR code "1" may be counted, and the RL data of the reference data may be continuously copied in the number less than the number by one.

As clearly understood from the above description, according to the present invention, in the decoding method of a facsimile or the like using MR code, ordinary decoding operation may be omitted when V(0) code continues, thereby realizing a higher receiving/-transmitting speed.

Although the present invention has been described by way of preferred embodiments, the invention is not limited to the embodiments but various changes and modifications may be made in the invention without departing from the scope and spirit thereof.

What is claimed is:

1. A method of decoding MR codes, comprising:
   defining a reference line comprising a plurality of picture elements, each of the plurality of picture elements comprising at least one of a black picture element and a white picture element, the reference line defining run length data,
   identifying as a change point each location in the reference line at which a black picture element is adjacent a white picture element,
   defining a decoding line comprising a plurality of picture elements, each of the plurality of picture elements comprising at least one of a black picture element and a white picture element,
   identifying as a change point each location in the decoding line at which a black picture element is adjacent a white picture element,
   identifying with the mode symbol V(0) each location in the decoding line at which a change point in the decoding line is identical to a change point in the reference line, and, for each location in the decoding line at which the number of V(0)'s in succession is equal to N, where N is an integer greater than 1.
   copying the run length data of the reference line for the first N−1 V(0)'s in succession, and
   decoding the Nth V(0).

2. A method of decoding MR codes, comprising:
   defining a reference line comprising a plurality of picture elements, each of the plurality of picture elements comprising at least one of a black picture element and a white picture element, the reference line defining run length data,
   identifying as a change point each location in the reference line at which a black picture element is adjacent a white picture element,
   defining a decoding line comprising a plurality of picture elements, each of the plurality of picture elements comprising at least one of a black picture element and a white picture element,
   identifying as a change point each location in the decoding line at which a black picture element is adjacent a white picture element, identifying with the mode symbol V(0) each location in the decoding line at which a change point in the decoding line is identical to a change point in the reference line, and, for each location in the decoding line at which the number of V(0)'s in succession is equal to N, where N is an integer greater than 1, copying the run length data of the reference line for the N V(0)'s in succession.

* * * * *